(12) United States Patent
Thomas

(10) Patent No.: US 6,502,243 B1
(45) Date of Patent: Dec. 31, 2002

(54) METHOD AND SYSTEM FOR LOCATING A RESOURCE WITHIN A BROADCASTING ENVIRONMENT

(75) Inventor: C. Gomer Thomas, Piscataway, NJ (US)

(73) Assignee: Lgerca, Inc., Princeton, NJ (US)

( * ) Notice: Subject to any disclaimer, the term of this patent is extended or adjusted under 35 U.S.C. 154(b) by 0 days.

(21) Appl. No.: 09/188,189

(22) Filed: Nov. 10, 1998

(51) Int. Cl.$^7$ .............................................. H04N 7/173
(52) U.S. Cl. ...................... 725/110; 725/51; 725/109; 725/112; 725/136
(58) Field of Search .................. 725/110, 172, 725/115, 136, 51, 56, 109; 709/217–219

(56) References Cited

U.S. PATENT DOCUMENTS

| | | | | | |
|---|---|---|---|---|---|
| 5,877,765 | A | * | 3/1999 | Dickman et al. | 345/349 |
| 5,886,995 | A | * | 3/1999 | Arsenault et al. | 370/477 |
| 5,905,865 | A | * | 5/1999 | Palmer et al. | 395/200.47 |
| 5,929,849 | A | * | 7/1999 | Kikinis | 345/327 |
| 6,018,764 | A | * | 1/2000 | Field et al. | 709/217 |
| 6,029,200 | A | * | 2/2000 | Beckerman et al. | 709/226 |
| 6,128,652 | A | * | 10/2000 | Toh et al. | 709/219 |
| 6,163,803 | A | * | 12/2000 | Watanabe | 709/217 |

FOREIGN PATENT DOCUMENTS

GB 2345814 A * 7/2000

OTHER PUBLICATIONS

"URL References for Broadcast DTV Object". ATSC T3/S8 Doc. 252, General Instruments, Feb. 26, 1998.
"URL Mapping". ATSC T3/S8 Doc. 253, Feb. 26, 1998.
DAVIC Digital Audio–Visual Council; DAVIC 1.3 Specification Part 09; Information Representation; Technical Specification, Revision 6.1.
Uniform Resource Locators for Television Broadcasts; D. Zigmond; WebTV Networks; Jun. 1997 (http://www.ics.uci.edu/pub/ieft/uri/draft–zigmond–tv–url–oo.txt).
Advanced Television Enhancement Forum Specification (ATVEF); Comment Draft Version 1.0r1 (http://www.atvef.com/atvef_spec/TVE–public.htm), Aug. 10, 1998.

* cited by examiner

Primary Examiner—Andrew Faile
Assistant Examiner—Ngoc Vu
(74) Attorney, Agent, or Firm—Birch, Stewart, Kolasch & Birch, LLP

(57) ABSTRACT

A system and method for locating a referenced resource within a broadcasting environment. The method includes storing translation information into a receiver memory, identifying a location of additional translation information for the referenced resource based on the translation information stored in the receiver memory corresponding to that referenced resource, receiving the additional translation information from a transport stream identified by the transport information stored in the receiver memory for the referenced source, and locating the referenced resource based on the additional translation information received.

38 Claims, 14 Drawing Sheets

| RECORD TYPE | LOGICAL NAME | TRANSLATION | EXPLANATION |
|---|---|---|---|
| A | XYZ.COM | T1 | TRANSPORT STREAM XYZ.COM IS T1 |
| R | XYZ.COM | T1 | TRANSLATION RECORDS FOR NAMES ENDING IN XYZ.COM ARE IN TRANSPORT STREAM T1 |
| A | MOVIES.XYZ.COM | T1.S2 | CHANNEL MOVIES.XYZ.COM IS T1.S2 |
| R | MOVIES.XYZ.COM | T1.S2 | TRANSLATION RECORDS FOR NAMES ENDING IN MOVIES.XYZ.COM ARE IN CHANNEL T1.S2 |
| A | FORCE10.ACTION.MOVIES.XYZ.COM | T1.S2.E1 | EVENT WITH GIVEN LOGICAL NAME IS T1.S2.E1 |
| A | HIGHNOON.WESTERN.MOVIES.XYZ.COM | T1.S2.E2 | EVENT WITH GIVEN LOGICAL NAME IS T1.S2.E2 |
| A | DUMBO.OTHER.MOVIES.XYZ.COM | T1.S2.E3 | EVENT WITH GIVEN LOGICAL NAME IS T1.S1.E3 |
| A | GENERAL.XYZ.COM | T1.S3 | CHANNEL GENERAL.XYZ.COM IS T2.S3 |
| R | GENERAL.XYZ.COM | T1.S3 | TRANSLATION RECORDS FOR NAMES ENDING IN GENERAL.XYZ.COM ARE IN CHANNEL T1.S3 |
| A | FOUR–OCLOCK.NEWS.GENERAL.XYZ.COM | T1.S3.E1 | EVENT WITH GIVEN LOGICAL NAME IS T1.S3.E1 |
| A | MON–NFL.SPORTS.GENERAL.XYZ.COM | T1.S3.E2 | EVENT WITH GIVEN LOGICAL NAME IS T1.S3.E2 |

DVB://4BE1.0713.2BC1.85

DTV://WC-SUMMARY.XYZ-SPORTS.XYZ.COM

| RECORD TYPE | LOGICAL NAME | TRANSLATION | EXPLANATION |
|---|---|---|---|
| A | XYZ.COM | T1 | TRANSPORT STREAM XYZ.COM IS T1 |
| R | XYZ.COM | T1 | TRANSLATION RECORDS FOR NAMES ENDING IN XYZ.COM ARE IN TRANSPORT STREAM T1 |
| A | MOVIES.XYZ.COM | T1.S2 | CHANNEL MOVIES.XYZ.COM IS T1.S2 |
| R | MOVIES.XYZ.COM | T1.S2 | TRANSLATION RECORDS FOR NAMES ENDING IN MOVIES.XYZ.COM ARE IN CHANNEL T1.S2 |
| A | FORCE10.ACTION.MOVIES.XYZ.COM | T1.S2.E1 | EVENT WITH GIVEN LOGICAL NAME IS T1.S2.E1 |
| A | HIGHNOON.WESTERN.MOVIES.XYZ.COM | T1.S2.E2 | EVENT WITH GIVEN LOGICAL NAME IS T1.S2.E2 |
| A | DUMBO.OTHER.MOVIES.XYZ.COM | T1.S2.E3 | EVENT WITH GIVEN LOGICAL NAME IS T1.S1.E3 |
| A | GENERAL.XYZ.COM | T1.S3 | CHANNEL GENERAL.XYZ.COM IS T2.S3 |
| R | GENERAL.XYZ.COM | T1.S3 | TRANSLATION RECORDS FOR NAMES ENDING IN GENERAL.XYZ.COM ARE IN CHANNEL T1.S3 |
| A | FOUR-OCLOCK.NEWS.GENERAL.XYZ.COM | T1.S3.E1 | EVENT WITH GIVEN LOGICAL NAME IS T1.S3.E1 |
| A | MON-NFL.SPORTS.GENERAL.XYZ.COM | T1.S3.E2 | EVENT WITH GIVEN LOGICAL NAME IS T1.S3.E2 |

FIG.5

| RECORD TYPE | LOGICAL NAME | TRANSLATION | LOCATION OF RECORD |
|---|---|---|---|
| A | XYZ.COM | T1 | T1 |
| R | XYZ.COM | T1 | T1 |
| A | MOVIES.XYZ.COM | T1.S2 | T1 |
| R | MOVIES.XYZ.COM | T1.S2 | T1 |
| A | FORCE10.ACTION.MOVIES.XYZ.COM | T1.S2.E1 | T1.S2 |
| A | HIGHNOON.WESTERN.MOVIES.XYZ.COM | T1.S2.E2 | T1.S2 |
| A | DUMBO.OTHER.MOVIES.XYZ.COM | T1.S2.E3 | T1.S2 |
| A | GENERAL.XYZ.COM | T1.S3 | T1 |
| R | GENERAL.XYZ.COM | T1.S3 | T1 |
| A | FOUR-OCLOCK.NEWS.GENERAL.XYZ.COM | T1.S3.E1 | T1.S3 |
| A | MON-NFL.SPORTS.GENERAL.XYZ.COM | T1.S3.E2 | T1.S3 |
| A | WXAB.COM | T1 | T1 |
| R | WXAB.COM | T1 | T1 |
| A | LOCAL.WXAB.COM | T1.S1 | T1 |
| A | MOVIES.WXAB.COM | T1.S2 | T1 |
| A | NEWS.WXAB.COM | T1.S3 | T1 |
| R | NEWS.WXAB.COM | T1.S3 | T1 |
| A | POLITICS.NEWS.WXAB.COM | T1.S3.E1 | T1.S3 |
| A | SPORTS.NEWS.WXAB.COM | T1.S3.E2 | T1.S3 |
| A | BUSINESS.NEWS.WXAB.COM | T1.S3.E3 | T1.S3 |

FIG.10

METHOD AND SYSTEM FOR LOCATING A RESOURCE WITHIN A BROADCASTING ENVIRONMENT

BACKGROUND OF THE INVENTION

1. Field of the Invention

The present invention relates to a system and method for locating a resource within a broadcasting environment. More specifically, the present invention relates to a system and method for enabling resources of one event, program, or transport stream within a broadcasting environment to be shared with resources of another event, program, or transport stream.

2. Description of the Conventional Art

A Digital Television (DTV) receiver receives data from multiple broadcasting entities. For instance, FIG. 1 illustrates a DTV receiver 11 that receives data from plural terrestrial broadcast stations 12, a cable system 13, a satellite system 14 and an Internet system 15.

Data is generally communicated to the receiver in the form of one or more transport streams. For instance, a feed from a terrestrial broadcast station 12 generally includes a single transport stream. However, a satellite or cable feed may contain a hundred or more transport streams.

FIG. 2 illustrates the content and structure of a conventional transport stream 21. As shown in FIG. 2, a conventional transport stream 21 generally includes a combination of one or more virtual channels 22, a single virtual channel 22 being capable of broadcasting a program. For instance, when broadcasting video programs, the virtual channel combines a video stream with one or more audio streams to provide multiple language capabilities, and one or more data streams to provide information which can be used to enhance the video program. Similarly, pure data programs can be broadcast having only data streams, each data stream representing a large number of data items to enable access by the receiver to tens of thousands of data items simultaneously.

A virtual channel 22 can therefore be described in terms of its component elementary streams 23 or its component events (not shown). Each elementary stream 23 within a virtual channel 22 includes one particular type of information, such as video information, audio information, or data. By contrast, unlike elementary streams 23, events generally include multiple types of information, such as a combination of video, audio and data. An event generally defines a portion of a program. For instance, an event might be a TV show. Events are often defined by criteria such as their duration.

The elementary streams 23 and events forming the virtual channels 22 may include data such as the HTML ("HyperText Mark-up Language") pages 24 shown in FIG. 2.

Moreover, the resources communicated to a DTV receiver potentially include virtual channels 22, elementary streams 23, events and/or individual data items 24.

It is sometimes useful to share the resources of related broadcasts that are received by a DTV receiver. For instance, using resources from within one channel or transport stream to supplement another channel or transport stream provides great flexibility for enhancing the viewing experience of the DTV viewer.

Conventionally, various schemes have been proposed for sharing the resources of related broadcasts without relying on bidirectional communication. However, as described in greater detail below, the conventional art fails to provide an efficient system for enabling resources to be shared between programs of separate channels within one or more transport streams, or even between events within separate programs.

Some conventional proposals for sharing the resources of related broadcasts are based on broadcasts which include embedded references to resources, which references are based on the absolute address of those resources or on some other fixed criteria for identifying the resources. Those proposals are therefore susceptible to some of the same problems experienced by direct addressing schemes applied to computer systems.

First, direct addressing schemes tend to be relatively inflexible with respect to relocation of resources since a change in the location of a resource frustrates fixed references to that resource previously embedded in other programs. For instance, if a resource is relocated, URLs embedded in programs under direct addressing schemes specify references to an outdated address for the resource.

Second, direct addressing schemes tend to be relatively inflexible with respect to replication of resources. Since each replicated copy of a resource requires an independent and unique address to avoid errors in a direct addressing scheme, an embedded reference to a fixed address cannot be used to achieve a hyperlink to any of the replicated copies. Therefore, the most convenient copy of a resource may not be available based on the fixed reference information embedded in the program.

The first and second problems are both evident when a single program is rebroadcast by multiple local affiliate stations or cable stations. Specifically, as demonstrated by FIG. 3, programs broadcast from a network broadcasting server 31 includes embedded references to resources of a local affiliate station addressed by call-sign (e.g., WXAB) or by channel (e.g., channel 17) of that local affiliate station. The program is retransmitted by local affiliates 32, WXAB and WXCD, and received by corresponding receivers 33, DTV#1 and DTV#2, respectively. The receiver 33 DTV#1 corresponding to local affiliate WXAB has access to the transmit stream and channel specified in the embedded reference, and the receiver DTV#2 corresponding to local affiliate WXCD is without access to the transmit stream and channel specified in the embedded reference.

A third problem with conventional proposals resembling a direct addressing scheme is illustrated by FIG. 4. FIG. 4 demonstrates the difficulties experienced by an operator attempting to understand the reference specified by a reference embedded using the direct addressing scheme correspond to an actual address of a resource, it is difficult for an operator viewing those embedded references to recognize the underlying resource being referenced. Furthermore, due to the lack of meaningful pneumonic, typographical errors and the like are easily missed by an operator.

As an alternative to the proposals involving schemes resembling direct addressing, proposals have been offered for schemes based on embedded references to pneumonics corresponding to resources. These proposals more closely resemble conventional indirect addressing processes.

One such proposal provides specifications for TV and unidirectional HTTP (HyperText Transfer Protocol) schemes. In each specification, embedded references are used to describe resources to be shared. However, neither specification provides an identifier for locating the source of a resource described by an embedded reference. Rather, the proposal for the HTTP scheme seems to require the receiver to look at the header of every data item received from every channel to identify a match for an embedded URL, a slow and resource intensive task. Additionally, the teachings of each of these specifications are limited to channels, neither suggesting the use of references to other resources such as elementary streams, events and/or data.

Another conventional proposal that resembles an indirect addressing scheme involves embedding references to groups of interlinked Web pages into a TV broadcast, and mapping the embedded references into references that are meaningful in the context of DTV. More specifically, this proposal involves the use of translation information transmitted along with the TV broadcast for translating embedded references having an Internet format (e.g., "http:" URLs) into a format that is meaningful in the context of DTV broadcasting (e.g., "dtv" or "atsc" URLs), so as to identify the location of corresponding resources within the TV broadcast. Such URL mappings could also be used more generally to translate URLs with arbitrary logical names for resources into URLs with direct addresses.

In order to locate the transport stream carrying an appropriate mapping table for translating an embedded URL, this proposal seems to require the entire mapping tables to be cached into memory by the DTV receivers. As such, the memory requirements and associated price of a conventional receiver adopting this proposed scheme would increase.

To compound this problem, conventional URL mappings used in this way require unnecessarily large mapping tables containing a great deal of redundant information. In most cases, all that is actually necessary is a mapping of the host name in the http URL to a corresponding event and elementary stream, not the full blown mapping described above. Furthermore, the mapping of the protocol can be inferred, and often the file path does not need to be mapped at all.

Moreover, the conventional art fails to provide an efficient system for enabling resources to be shared between programs of separate channels within one or more transport streams.

SUMMARY OF THE INVENTION

The present invention is directed to system that substantially obviates one or more of the problems experienced due to the above and other limitations and disadvantages of the related art.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes a system and method for enabling a referenced resource to be located within a broadcasting environment, where the method includes storing translation information into a receiver memory, identifying a location of additional translation information for the referenced resource based on the translation information stored in the receiver memory corresponding to that referenced resource, receiving the additional translation information from a transport stream identified by the transport information stored in the receiver memory for the referenced source, and locating the referenced resource based on the additional translation information received.

The process of storing the translation information in the receiver memory may involve storing less than all of the translation information communicated to the receiver, where the translation information stored in the receiver memory identifies a transport stream for the referenced resource. In addition, locating the referenced resource may include receiving further translating information from a channel identified by the additional translation information, and locating the referenced resource based on the further translation information received.

The system for enabling a referenced resource to be located within a broadcasting environment includes componentry capable of performing the above-mentioned tasks. A system and method for enabling a referenced resource to be located within a broadcasting environment, where the method includes storing translation information into a receiver memory, identifying a location of additional translation information for the referenced resource based on the translation information stored in the receiver memory corresponding to that referenced resource, receiving the additional translation information from a transport stream identified by the transport information stored in the receiver memory for the referenced source, and locating the referenced resource based on the additional translation information received.

The process of storing the translation information in the receiver memory may involve storing less than all of the translation information communicated to the receiver, where the translation information stored in the receiver memory identifies a transport stream for the referenced resource. In addition, locating the referenced resource may include receiving further translating information from a channel identified by the additional translation information, and locating the referenced resource based on the further translation information received.

The system for enabling a referenced resource to be located within a broadcasting environment includes componentry capable of performing the above-mentioned tasks.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operation, and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The present invention will become more fully understood from the detailed description given hereinbelow and from the accompanying drawings which are given by way of illustration only, and thus are not limitative of the present invention, and wherein:

FIG. 5 shows exemplary contents of a translation table used by a receiver to identify the resources shown in FIG. 6A based on an embedded reference (e.g., URL) according to the present invention;

FIG. 10 illustrates translation records that are broadcast by an affiliate rebroadcasting station according to the present invention;

DESCRIPTION OF THE PREFERRED EMBODIMENTS

Reference will now be made in detail to the preferred embodiments of the present invention, examples of which are illustrated in the accompanying drawings.

In the preferred embodiment of this invention, a URL (Uniform Resource Locator) is embedded into an event, program or transport stream as a logical representation of the resource intended for hyperlinking. Using this logical representation, the receiver is able to determine the location of a resource specified by the URL. As such, the present invention is capable of locating a resource (event, elementary stream, channel, etc.) corresponding to a URL used to identify that resource.

More specifically, in a preferred embodiment of the present invention, resources from different programs or transport streams may be shared and cross-referenced in an efficient manner. A DTV broadcast server broadcasts a translation table for identifying either the location of a shared resource or the location of additional translation information leading to the location of the shared resource.

The translation information is arranged in a hierarchical format. A DTV receiver default caches only the top level records, not the complete translation information, generally including less than all of the information required to locate a resource. Furthermore, the receiver cache memory is only required to store an amount of information sufficient to identify the location of further translating information, although it may store more information if desired.

Figure 1:
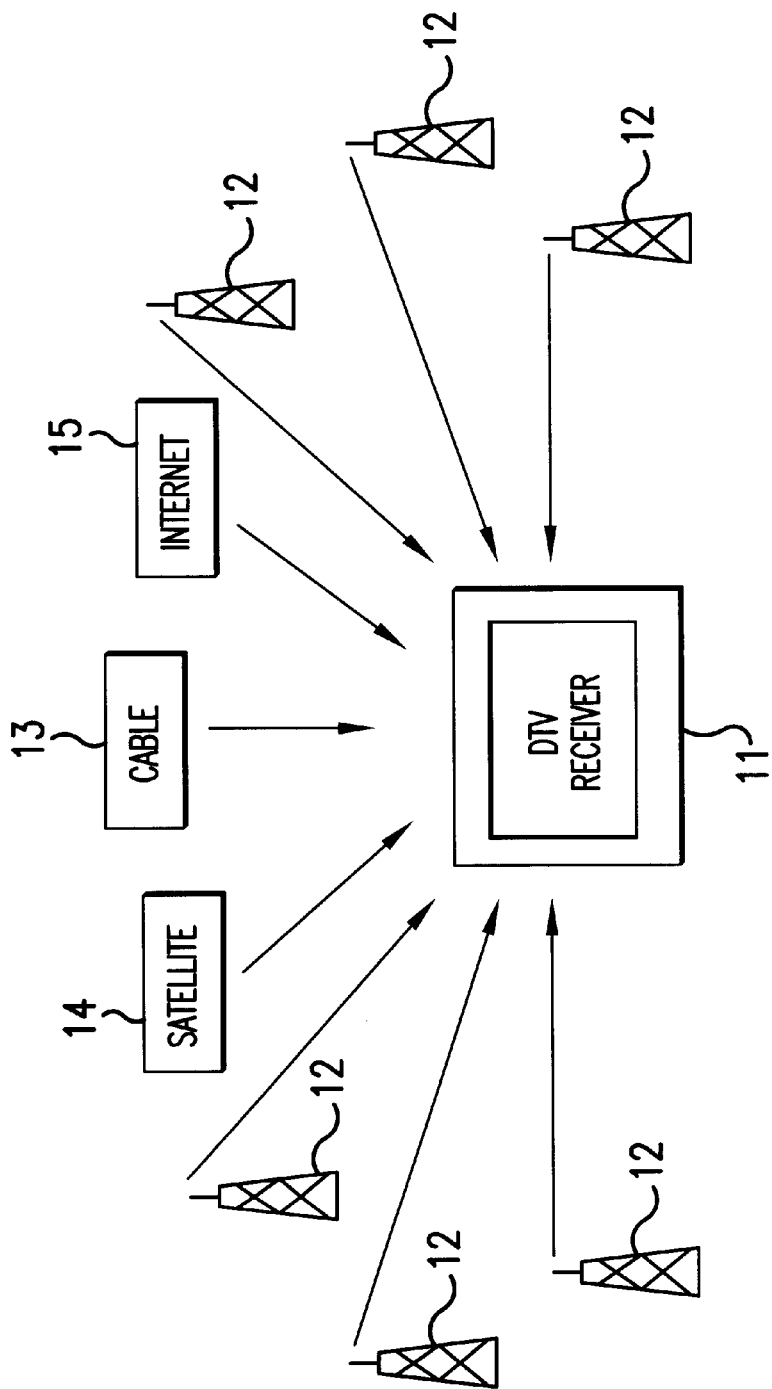
FIG. 1 is a diagram illustrating a conventional digital television broadcasting environment.
Figure 2:
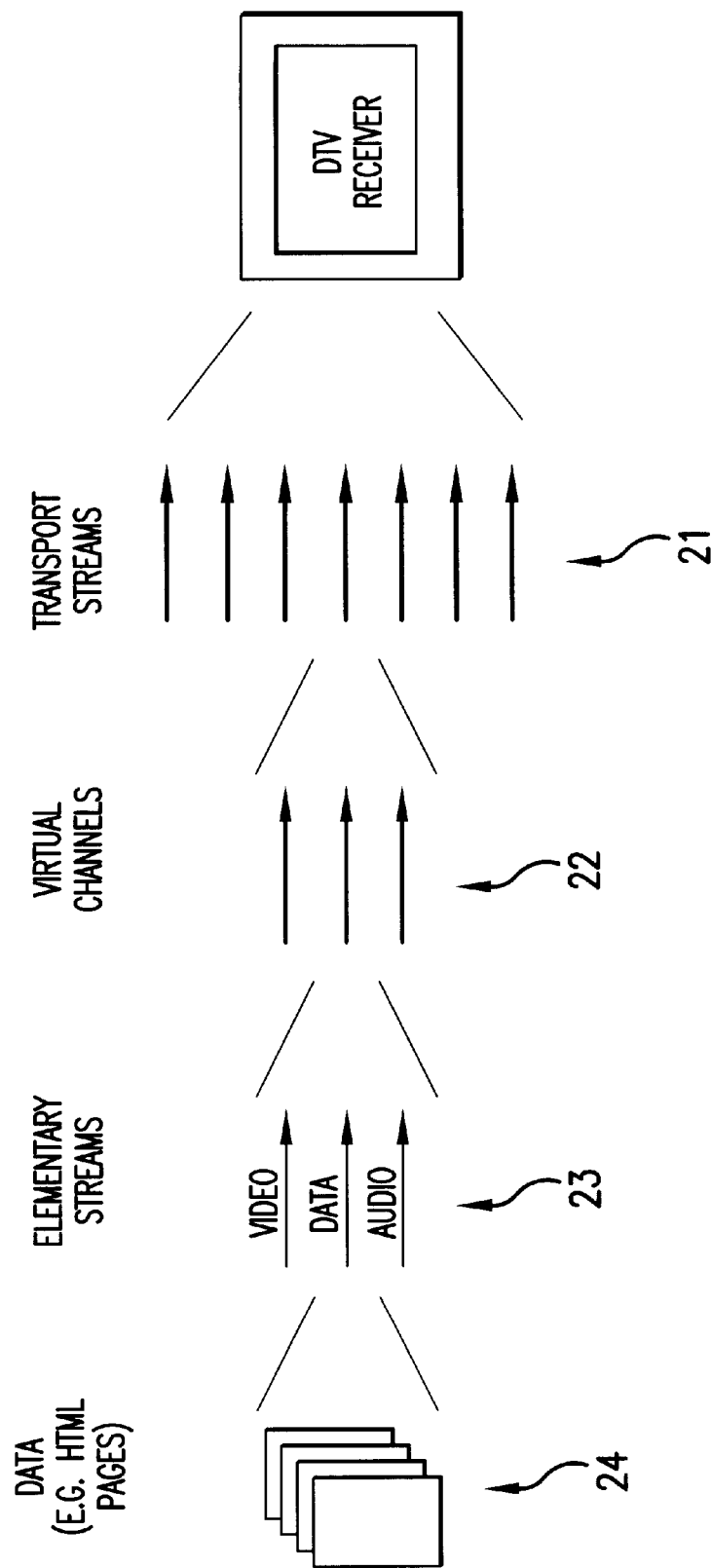
FIG. 2 is a diagram illustrating the components of a digital television transport stream.
Figure 3:
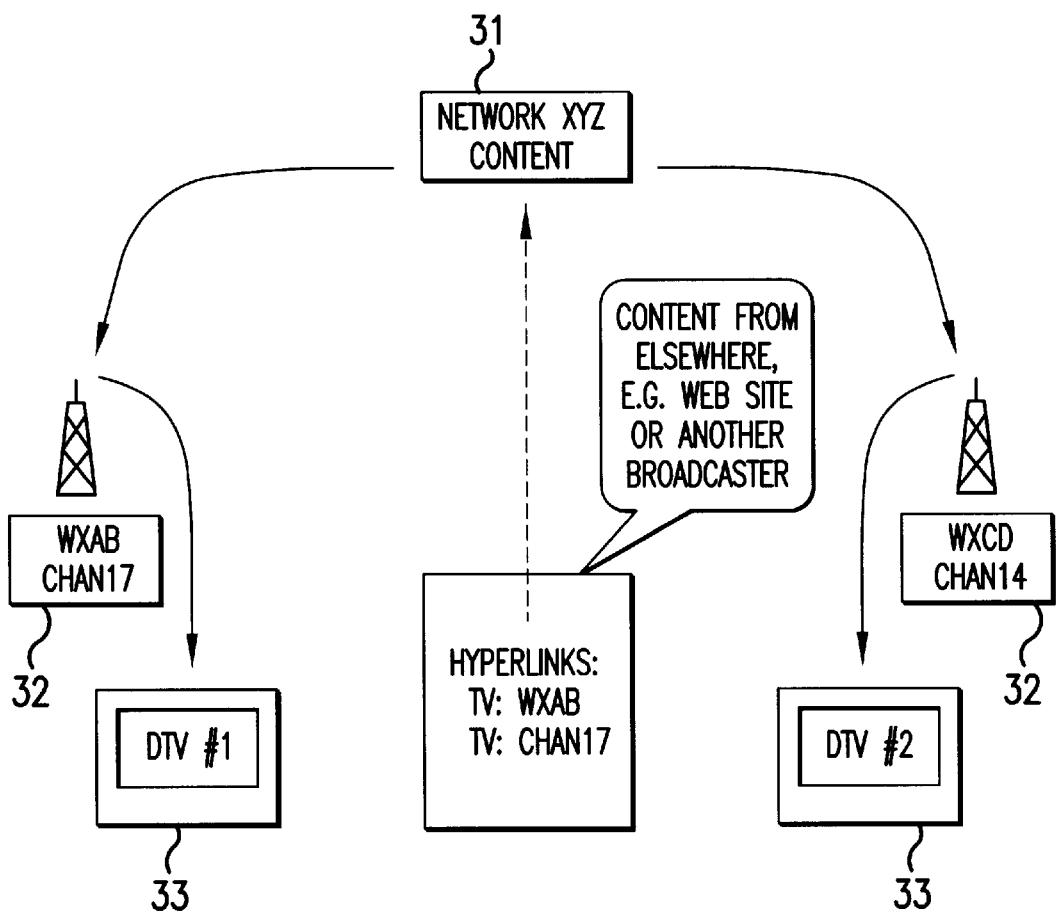
FIG. 3 is a diagram illustrating difficulties experienced by conventional schemes in which fixed references to resources outside a program or transport stream are embedded within a program.
Figure 4:
FIG. 4 is a diagram illustrating difficulties in understanding references that indicate addresses without using pneumonics.
Figure 6A:
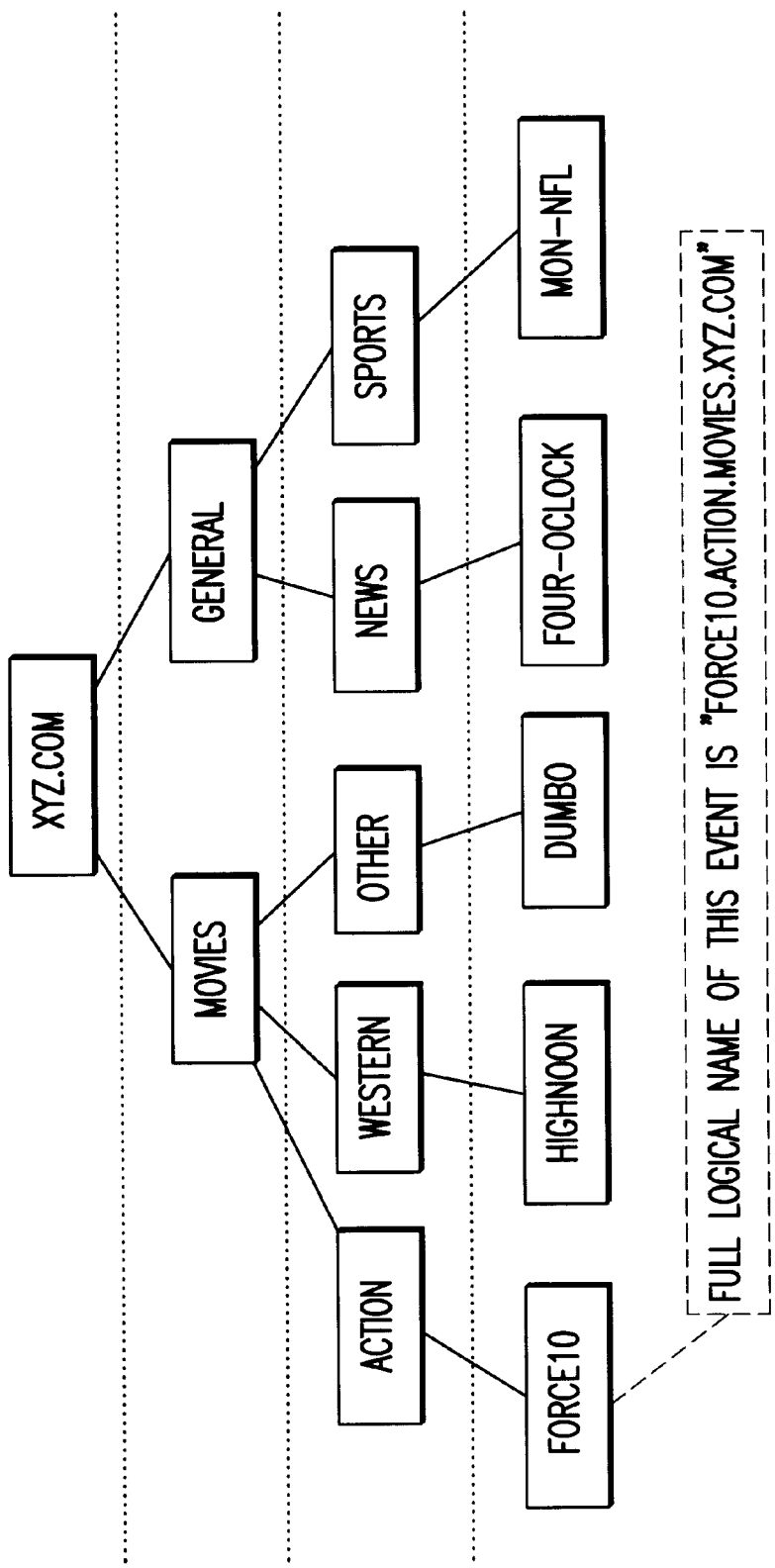
FIGS. 6A–6C show the hierarchical structural of three different groups of resources according to the present invention.

FIG. 5 shows the contents of a translation table broadcast by a server to identify the resources shown in FIG. 6A based on an embedded reference (e.g., URL). FIG. 5 shows related "record types", logic names", and "translation" fields within a translation table, followed by an explanation that would not ordinarily be broadcast or included in the receiver memory.

The record type field is intended to reduce the number of translation records which must be stored in a DTV receiver's cache. There are at least two types of translation records stored in the translation table, namely "A" records and "R" records. "A" records indicate the location of a resource within the broadcast stream. By contrast, "R" records indicate the location of the "A" records within the broadcast.

The higher level records "R" in a DTV receiver's cache are periodically updated based on a scanning process performed by the DTV receiver. This periodic update is not overly burdensome on the receiver since it is performed infrequently and since it can be combined with other scanning functions ordinarily performed by DTV receivers. More specifically, these updates are not frequently required due to the stable nature of the higher level records. In fact, this periodic update can be performed in combination with the scan ordinarily performed by DTV receivers every few hours to retrieve other system and program information (e.g., channel guide update). Additionally, if necessary, the lower level translation records "A" may be refreshed from appropriate transport streams identified in the update. The use of "R" records in the present invention allows complete flexibility for distributing translation records among transport streams and channels within transport streams.

The translation field within the translation table identifies the location of the resources or further translation information therefor. The explanation section shown on the last column to the right of the translation table shown in FIG. 5 is not ordinarily included in the translation table; rather, it is provided to aid in the understanding of the invention.

The following describes the operation of the hierarchical translation records shown in FIG. 5, referring to corresponding FIG. 6A. FIG. 6A includes four levels, the highest level being xyz.com. Therefore, as shown in FIG. 5, the translation for each logical name begins with the same transport stream identifier. In situations where no other information is provided (e.g., "xyz.com"), the receiver is directed to transport stream T1 for further translation information. However, when additional information is provided, the translation table may provide additional information concerning the location of the resource.

Figure 6B:
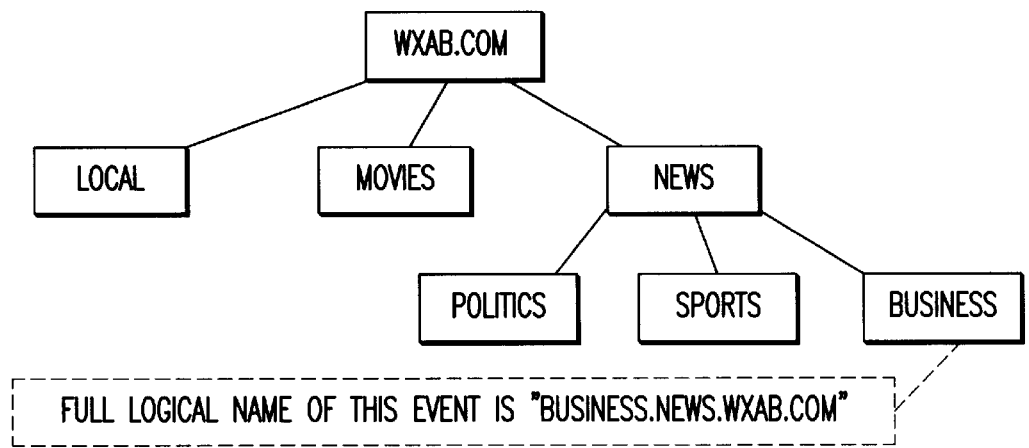
Figure 6C:
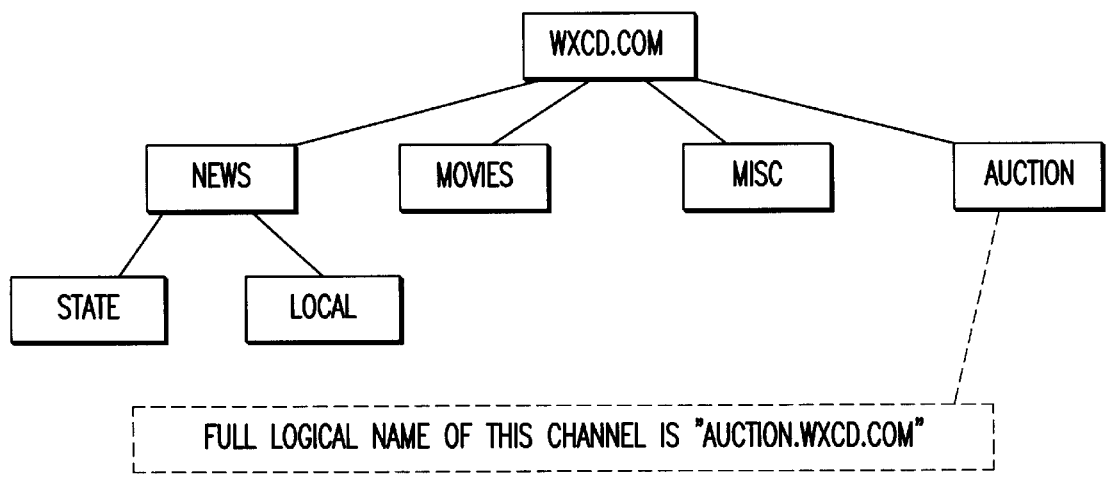

In this manner, the logical names are structured with a hierarchy capable of describing the location of a resource relative to other resources. For instance, in FIG. 5, the logical name for the resource identified as "Force10" is "Force10.action.movies.xyz.com" since that resource is shown to be subordinate to xyz.com, movies and action, in that order. Similarly, the resource of FIG. 6B identified as "business" has the logical name, "business.news.wxab.com" since it is subordinate to wxab.com, news and business in that order. FIG. 6C illustrates a similar concept.

As apparent from the above discussion, logical URLs are generally formatted as follows: <protocol>://<trunk>/<path>, where the <trunk> and <path> portions contain two different ordered lists of logical identifiers. In addition, the <trunk> portion of the URL needs to be translated, but the <path> portion needs no translation. The <trunk>and <path> can be visually distinguished by the backslashes (/) separating the path components and the periods (.) separating the trunk components.

For example, consider the URL, "dtv://four-oclock.news.general.xyz.com/ticker/4". The <trunk> portion corresponds to "four-oclock.news.general.xyz.com", which can be translated using translation information into a specific event of a specific virtual channel of a specific transport stream. Then, the <path> portion tells the receiver to look in the Service Description Table for the event, under the application name "ticker" and tap_id "4" to find the elementary stream actually containing the referenced data file.

Based on the hierarchical organization of the logical names and their relationship to the structure and organization of broadcast data, identification of the resources specified by an embedded URL can be accomplished quickly and easily using the present invention.

Figure 7:
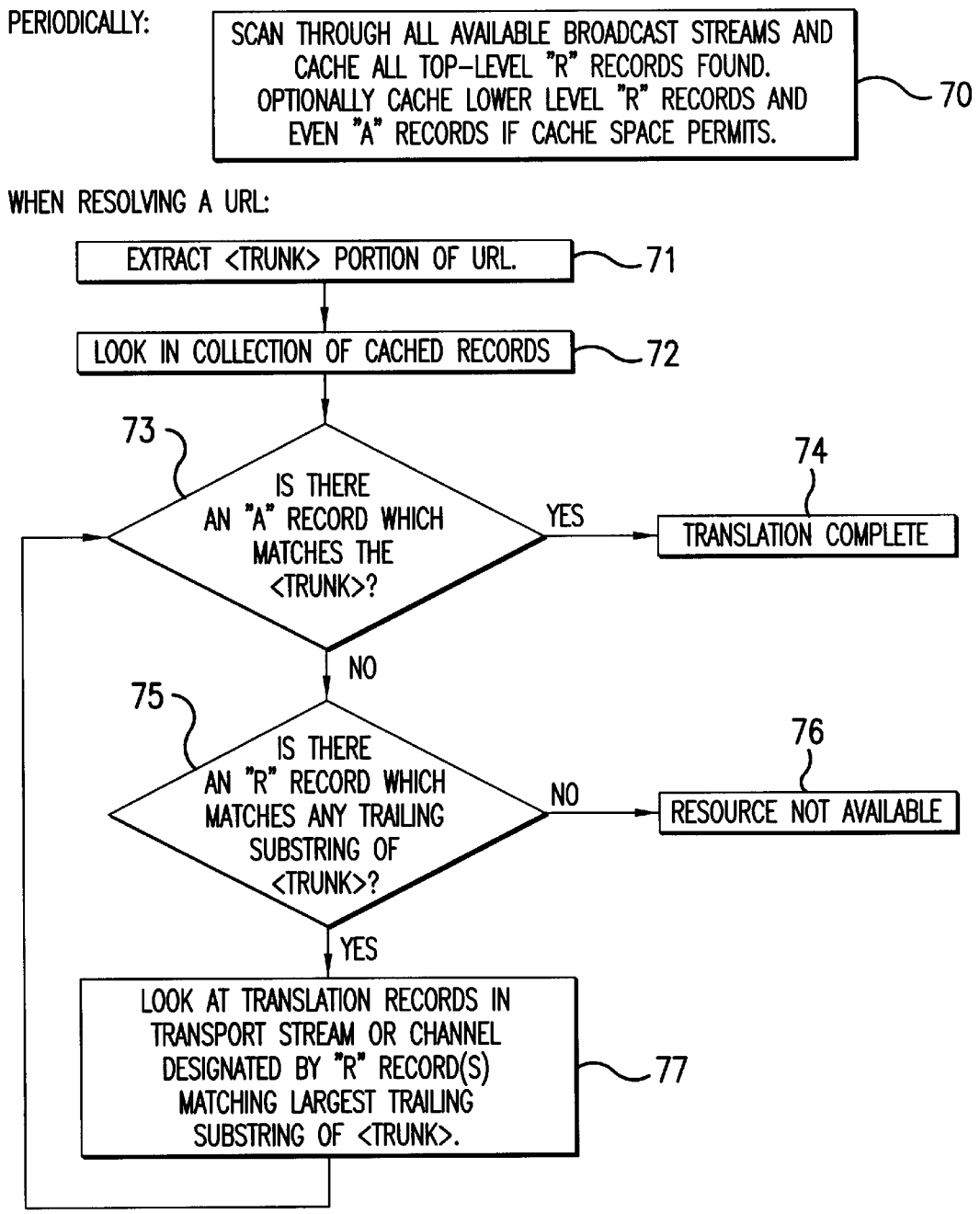
FIG. 7 is a flowchart showing exemplary steps taken by a DTV receiver to locate a resource that was referenced by an embedded URL according to the present invention.

FIG. 7 is a flowchart showing steps taken by a DTV receiver to locate a resource that was referenced by an embedded URL. Step 70 is periodically performed, independent of steps 71–77, to update the translation table with current locations of all top-level "R" records, and possibly some "A" records if additional cache space remains available after storing the "R" records. Steps 71–77 are performed to resolve a URL based on the translation table updated in step 70. In steps 71 and 72, a trunk portion of the URL is extracted and the cached records are examined, respectively. If an "A" record matches the extracted trunk in step 73, the location of the resource corresponding to the URL is reflected by the translation field of the matching "A" record. Therefore, the translation is deemed completed in step 74.

However, if the trunk of the URL does not match any "A" records within the translation table, the process continues with step 75 where the trunk of the URL is compared with "R" records of the cache. The absence of a match with an "A" and an "R" record leads to termination of the process in step 76. However, if at least one "R" record matches the extracted trunk in step 75, the location of additional translation information is revealed by the translation field in the cache memory of the receiver. Thus, the channel or transport stream specified by the translation field must be examined for additional translation information in step 77. That is, in step 77, the receiver examines translation records in the transport stream, channel or other entry identified by one or more "R" records that match the largest trailing substring of the trunk of the URL. In the case where multiple "R" records matching the trunk of the URL exist, the receiver may examine one or more of these "R" records according to any certain criteria, such as "examine the first discovered "R" record", "examine one of these "R" records picked randomly", etc. Processing is returned to step 73 to determine whether the additional translation information matches any "A" or "R" records within the translation memory.

Eventually, the process described with respect to FIG. 7 terminates with step 74 or step 76, step 74 indicating the identification of the resource specified by the URL, step 76 indicating that the URL reference is unknown. As such, a DTV receiver is able to determine whether access to a specified resource even exists by performing the process of FIG. 7.

Unlike receivers, broadcasting servers must determine a logical name hierarchy for their transport streams, virtual channels, and events, similar to the type of name hierarchy which appears in computer file systems or in Internet domain names. They would make this name hierarchy known to any content creator who might want to refer to their transport streams, virtual channels, and/or events. When networks and local affiliates are encountered, typically the networks would have a name hierarchy for the events in their network feeds, and the local affiliates would have a name hierarchy for their locally generated events.

Each local affiliate broadcasts translation records for the name space of the network, as well as for its own name space. The translation records for the network are adjusted to provide the correct translation in the context of the signals of the individual local affiliate. That is, the translation tables provided by the network have placeholders for the transport stream ID, channel ID, and event ID. The local affiliate would replace these with the actual values.

Other content providers could also have a name hierarchy and set of translation records for their content, as long as all broadcasters who broadcast their content also broadcast their translation records, adjusted to provide the correct translation in the context of that particular broadcast.

Figure 8:
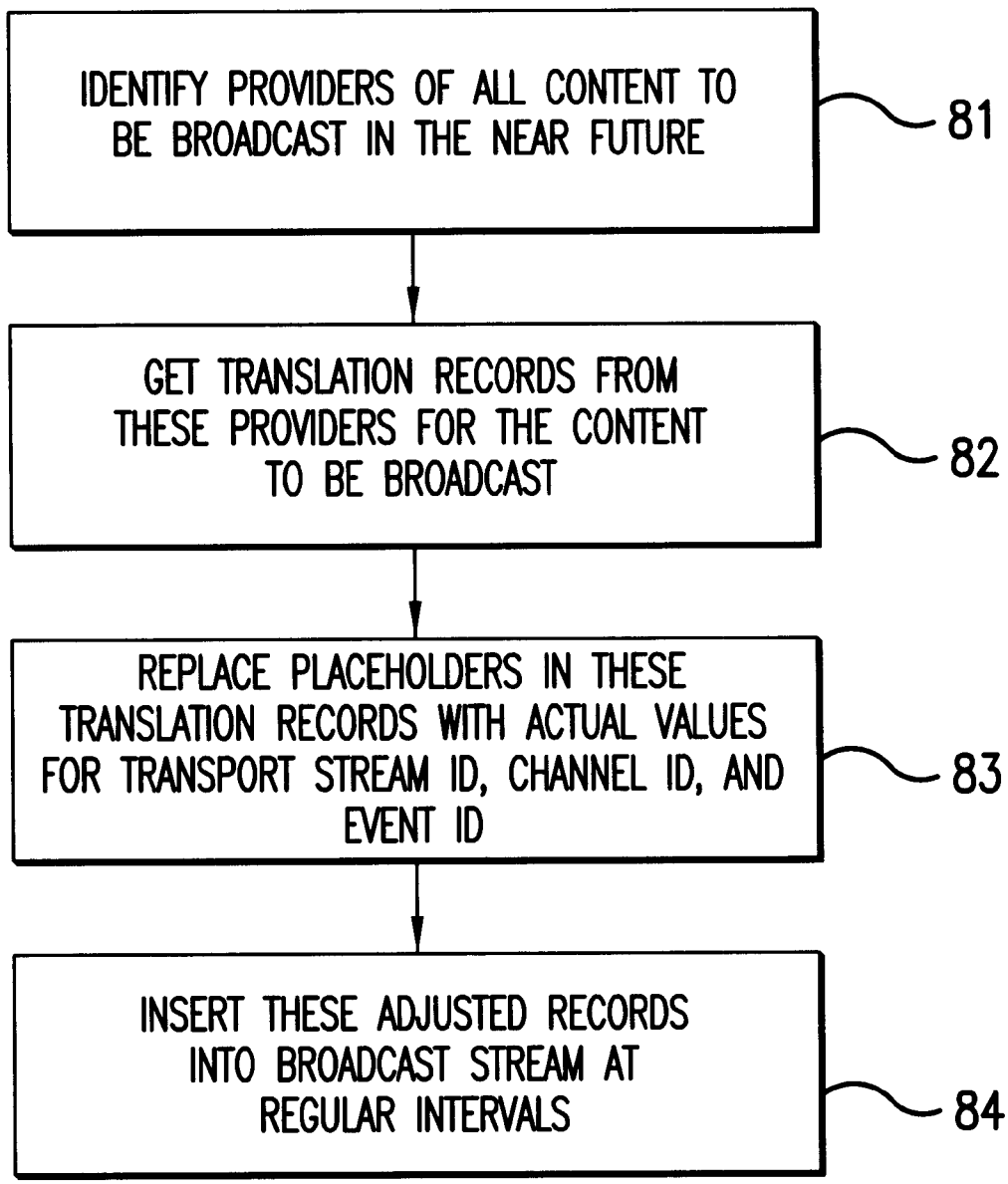
FIG. 8 shows a flowchart describing exemplary steps taken by a broadcaster to assemble and broadcast translation information according to the present invention.

FIG. 8 shows a flowchart describing exemplary steps taken by a broadcaster to assemble and broadcast necessary translation information. In steps 81 and 82, the providers of all content to be broadcast in the near future (e.g., 12 hours) are identified, and translation information is obtained from them. In step 83, placeholders in the translation records are replaced with actual values corresponding to the content to be broadcast, such as transport stream id, channel id and event id parameters. In step 84, the corrected translation records are inserted into the broadcast stream for transmission at regular intervals.

Generally, TV receivers are not equipped with transmission equipment, rendering them incapable of two-way communication with the broadcast servers. For that reason, the receivers are generally unable to send signals illiciting additional information concerning the location of an embedded resource.

However, through the use of stored translation tables, as described above, the present invention is able to identify a broadcasting server transmitting information corresponding to an embedded resource. Therefore, using the stored translation information, the receiver is able to identify and monitor an appropriate broadcast server to obtain resource information, without requiring any two-way communication with the server. In fact, depending upon the level of detail stored in the translation table and the frequency with which the broadcast stations transmit translation information, the present invention may be able to locate resource information at a relatively high speed using a relatively small memory.

As such, the present invention requires little, if any, hardware changes to existing broadcast servers. In addition, since broadcast servers are able to continue to operate with little variation, existing receivers are not rendered completely obsolete. Rather, they remain marginally operational, albeit unable to store translation tables.

Hereinafter, an example is provided to help illustrate the operations performed by a preferred embodiment of the present invention. The context of this example is the merging of network content with local content.

In the ATSC DTV environment, a possible direct addressing scheme for events is:

<transport_id>.<source_id>.<event_id>.

Figure 9:
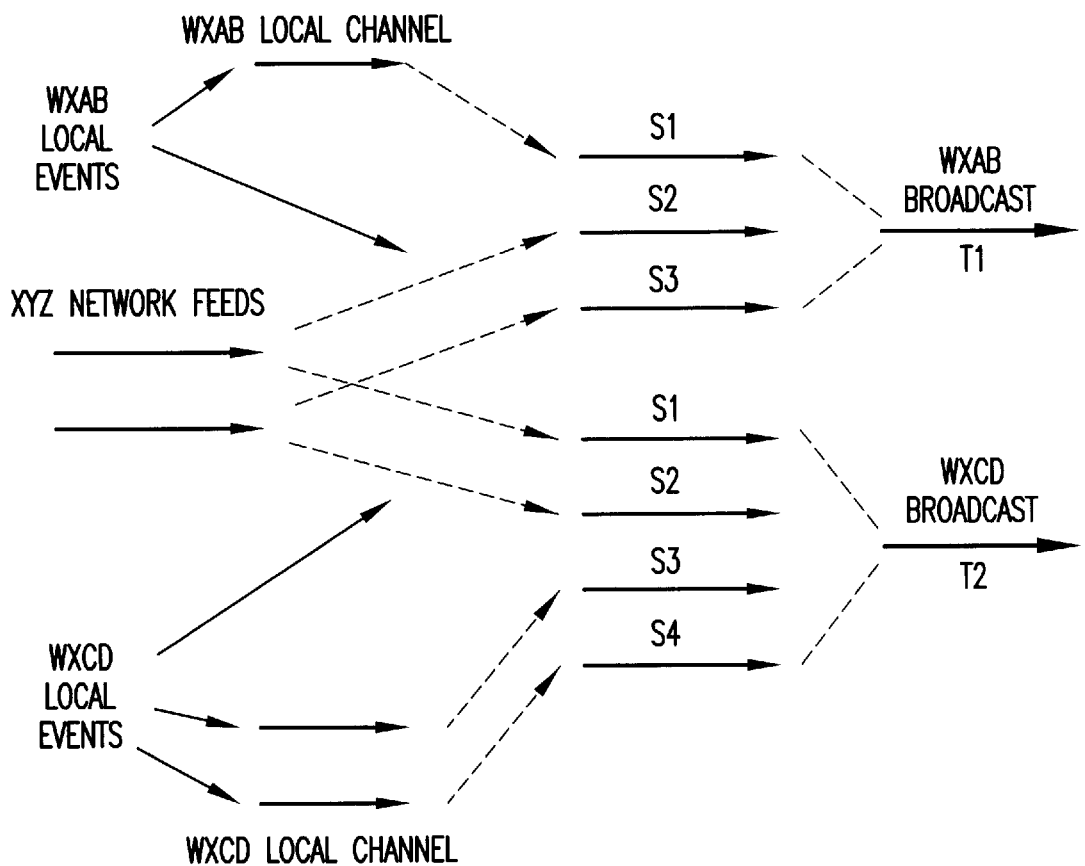
FIG. 9 shows an exemplary configuration of data structures formed when network content is merged with local content according to the present invention.

For the purposes of this example, assume a configuration as illustrated by FIG. 9. More specifically, assume the local affiliate WXAB of network XYZ uses transport stream id T1 for its broadcasts, and includes 3 virtual channels in the transport stream with source ids S1, S2, S3. Assume also that a different local affiliate WXCD of the same network XYZ uses transport stream id T2, and includes 4 virtual channels in the transport stream with source ids S1, S2, S3, S4. Suppose the XYZ network feed includes 2 virtual channels, which WXAB always maps to its virtual channels S2 and S3, and WXCD always maps to its virtual channels S1 and S2. In both cases, the local affiliates sometimes drop network events in these channels and replace them with locally generated content, as well as having locally generated events in the other channels.

FIG. 10 illustrates translation records that are broadcast by an affiliate, e.g., WXAB.

A receiver in the WXAB listening area would periodically scan the transport streams to which it has access. When encountering the translation records for WXAB, it would cache the "R" records "R: xyz.com_T1" and "R: wxab.com_T1". It could also cache the lower level records, but only if memory were sufficient to accommodate those records. When the receiver needs to locate a URL such as "dtv://four-oclock.news.general.xyz.com/", it can determine from its cached "R" records that the translation records for this URL can be found in transport stream T1. Therefore, the receiver would tune to transport stream T1, if it was not already tuned to it, to find the translation records needed to determine the direct address of the event as it appears in the broadcast from WXAB. Within that transport stream it would find the "R" record "R:general.xyz.com_T1.S3". It would then look in logical channel T1.S3 to find the translation record "A:four-oclock.news.general.xyz.com_T1.S3.E1", where E1 is the event-id of the 4 o'clock news.

Figure 11:
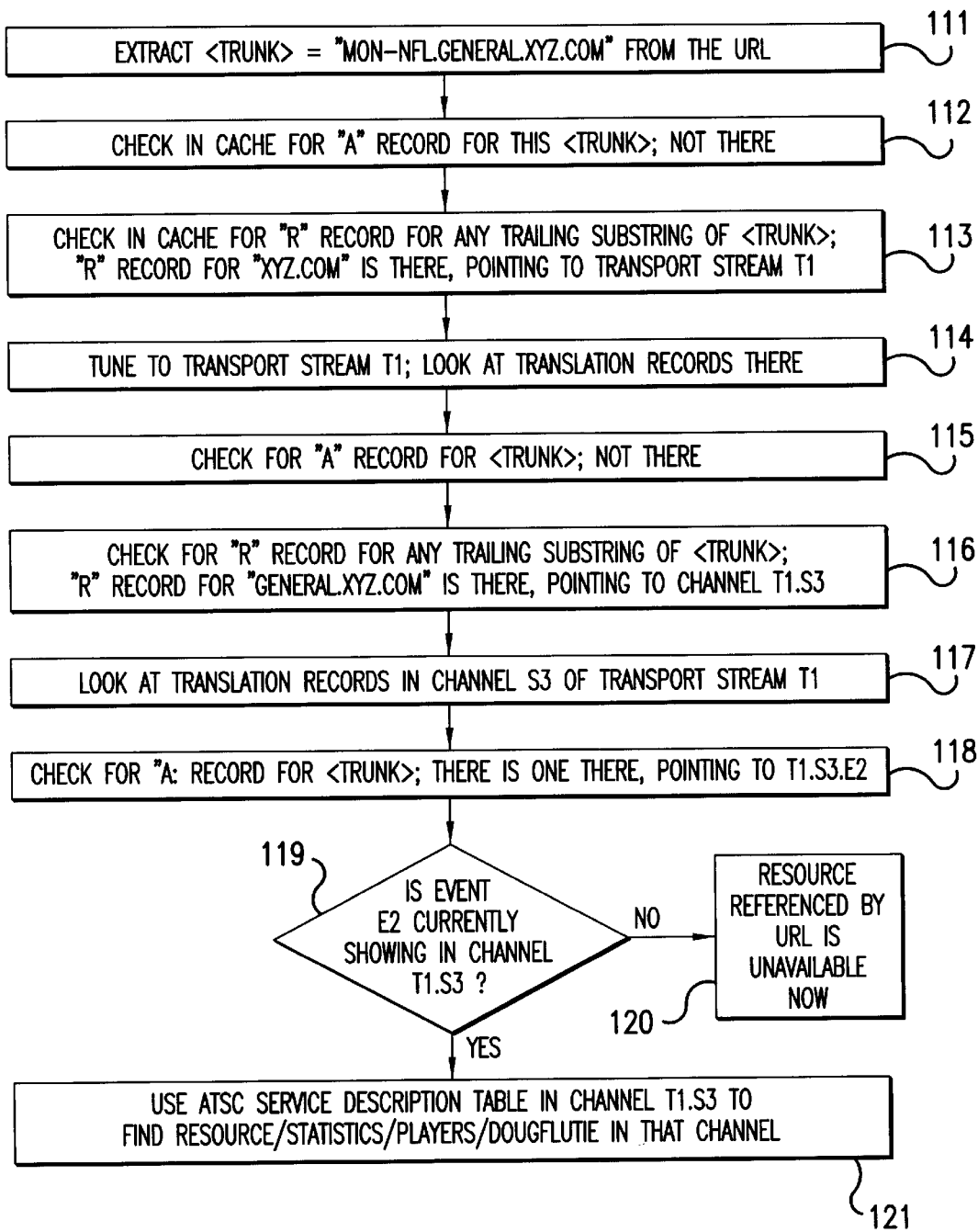
FIG. 11 is a flowchart illustrating an exemplary process performed by a DTV receiver according to the present invention.

FIG. 11 is a flowchart illustrating the process performed in this example. In step 111, the trunk of a URL is extracted, yielding "Mon-NFL.sports.general.xyz.com". The extracted yield is compared with cached "A" and "R" translation records in steps 112 and 113. In step 114, the receiver tunes to a transport stream specified by the "R" cache. The "A" cache is then checked for a match in step 115. Since no match is found, the "R" cache is checked for additional matches in step 116, and a match is found for "general.xyz.com" pointing to channel T1.S3. Since the match in the "R" cache points to channel T1.S3, the receiver checks channel S3 of transport stream T1 for additional translation information in step 117. Next, in step 118, the "A" cache is checked for matches, and a match is found pointing to T1.S3.E2. In step 119, the event E2 is checked for current operation. If event E2 is currently showing, a Service Descriptor.Table within channel T1.S3 is consulted to find resource/statistics/players/DougFlutie in step 121. However, if event E2 is not currently showing, the referenced resource is deemed currently unavailable in step 120.

A receiver in the WXCD listening area performs the same steps for the same URL, but it would end up with the direct address as it appears in the broadcasts from WXCD since it is receiving translation tables from WXCD.

There is often a one-to-one correspondence between the levels in the logical name hierarchy and the levels in the direct addressing scheme. However, as demonstrated by the above example, a single level in the logical hierarchy could correspond to multiple levels in the direct addressing scheme, or multiple levels in the logical hierarchy could correspond to a single level in the direct addressing scheme. Such flexibility allows the same logical name to be resolved into different direct addresses by different receivers in different locations, when the different direct addresses do not all have the same number of levels, such as DVB (Digital Video Broadcasting) vs. ATSC (Advanced Television Systems Committee) broadcasts.

Figure 12:
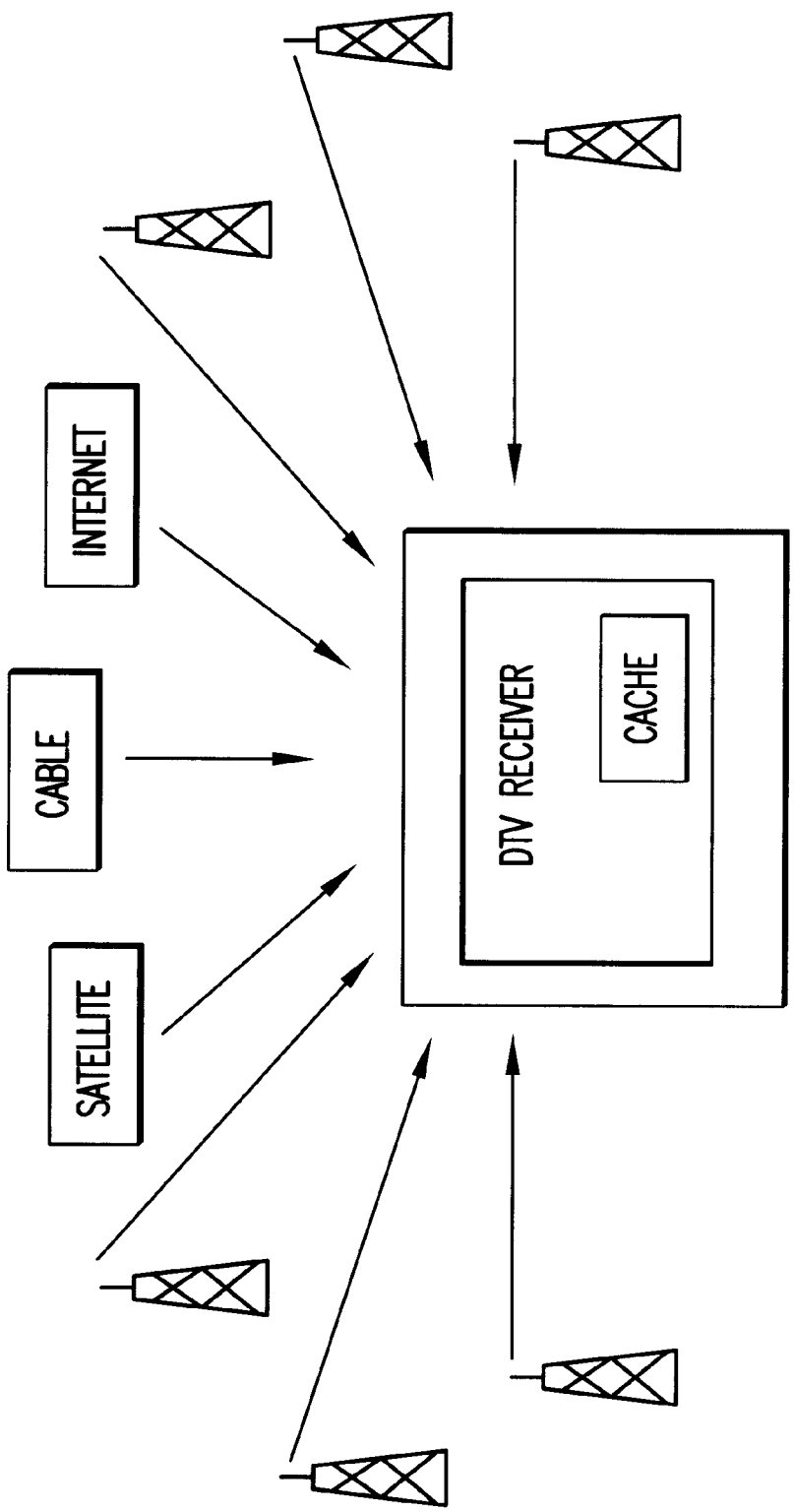
FIG. 12 illustrates a system for performing the present invention including a DTV receiver and various types of transmitters adapted to operate in conformity with the present invention.

FIG. 12 illustrates a system for performing the present invention including a DTV receiver and various types of transmitters adapted to operate in conformity with the present invention. As illustrated, the receiver includes a cache for storing translation information in a hierarchical manner, and transmitters that broadcast translation information to enable receivers to locate resources therefrom.

Note that the term broadcast, as used in this specification, includes transmission or communication of voice, audio and/or data.

A number of syntactic devices can be used to reduce the number of bytes required for broadcasting and storing the translation records. In many cases there will be an "A" record and an "R" record with the same logical name and same associated target address. A single record could be transmitted and stored in such a situation, with some designation such as "B" for the record, to indicate it is both an "A" record and an "R" record.

In many cases there will be multiple translation records containing a common portion of the logical name and a common portion of the target address. In such a situation a syntax could be used which allows the common portion to be transmitted only once. For example, the information in the three records:

"A:P1.Q.R_T.S1" and "A:P2.Q.R_T.S2" and "A:P3Q.R_T.S3" could be transmitted with some such syntax as "A: {P1,P2,P3}.Q.R_T.{S1,S2,S3}". In many cases one or more components of the target address of a translation record will be the same as those containing the translation record itself. In such a situation some sort of compact symbol could be used to represent each such component in the representation of the target address which appears in the record. An example might be "R:X.Y.Z._$.$", where "$" is the special symbol meaning "this one". This particular syntactic device also has be advantage that in many cases it could be inserted into the records by the original content provider and would not have to be modified by the broadcast server. All the broadcaster would have to do would be to include the translation records at the appropriate place in the broadcast stream.

While there have been illustrated and described what are at present considered to be preferred embodiments of the present invention, it will be understood by those skilled in the art that various changes and modification may be made, and equivalents may be substituted for elements thereof without departing from the true scope of the present invention. In addition, many modifications may be made to adapt a particular situation or material to the teaching of the present invention without departing from the central scope thereof. For instance, the concepts described could be easily adapted for use with broadcasting systems other than DTV. In another example, although it has been described above that the location of the additional translation information (i.e., a place where the additional translation can be found) may be one or more transport streams, one or more virtual channels within the transport stream, one or more PIDs, etc., the location of the additional translation information is not limited to such, but can be any other location or entity. Further, this location information can be expressed in any form including as some agreed signal, as long as it points to where the additional information can be found, which may be at one or more different places. Therefor, it is intended that the present invention not be limited to the particular embodiment disclosed as the best mode contemplated for carrying out the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What I claim is:

1. A method for enabling a referenced resource to be located within a broadcasting environment, comprising:

storing translation information into a receiver memory; and identifying at least one location, in a broadcast stream, of additional translation information for the referenced resource by referring to the translation information stored in the receiver memory corresponding to that referenced resource, wherein the step of storing the translation information in the receiver memory stores less than all of the translation information communicated to the receiver.

2. The method of claim 1, wherein the translation information stored in the receiver memory identifies at least one broadcast stream for the additional translation information.

3. The method of claim 1, further comprising:

receiving the additional translation information from a location identified by the translation information stored in the receiver memory for the referenced resource.

4. The method of claim 3, further comprising:

locating the referenced resource based on the additional translation information received.

5. The method of claim 2, further comprising:

obtaining the additional translation information from said at least one broadcast stream identified by the translation information stored in the receiver memory for the referenced resource, the additional translation information identifying a further location associated with the referenced resource;

receiving further translation information from the further location identified by the additional translation information; and locating the referenced resource based on the further translation information received.

6. The method of claim 1, wherein the translation information that enables the referenced resource to be located is output by a transmitting station.

7. The method of claim 1:

wherein said translation information includes lower level records indicative of a location of a referenced resource within a broadcast stream and higher level records indicative of a location of the lower level records; and wherein storage of less than all of said translation information is accomplished by storing less than all of the lower level records.

8. The method of claim 1, wherein said additional translation information points to a location, in said broadcast stream, of at least one further additional translation information for the referenced resource.

9. The method of claim 1, further comprising:

examining said additional translation information for the referenced resource in one of said at least one location;

second identifying a location of at least one further additional translation information for the referenced resource based on said examined additional translation information; and repeating said examining step and said second identifying step until the location of the referenced resource is found.

10. The method of claim 1, wherein said translation information includes lower level records indicative of a location of a referenced resource within a broadcast stream and higher level records indicative of a location of the lower level records.

11. The method of claim 1, wherein the resource is referenced by a URL.

12. A system for enabling a referenced resource to be located within a broadcasting environment, comprising:

a receiver memory that stores translation information; and means for identifying at least one location, in a broadcast stream, of additional translation information for the referenced resource by referring to the translation information stored in the receiver memory corresponding to that referenced resource, wherein the receiver memory stores less than all of the translation information communicated to the receiver.

13. The system of claim 12, wherein the receiver memory stores translation information identifying at least one broadcast stream for the additional translation information.

14. The system of claim 12, further comprising:

means for receiving the additional translation information from a location identified by the translation information stored in the receiving memory for the referenced resource.

15. The system of claim 14, further comprising:

means for locating the referenced resource based on the additional translation information received.

16. The system of claim 13, further comprising:

means for obtaining the additional translation information from said at least one broadcast stream identified by the translation information stored in the receiver memory for the referenced resource, the additional translation information identifying a further location associated with the referenced resource;

means for receiving further translation information from the further location identified by the additional translation information; and means for locating the referenced resource based on the further translation information received.

17. The system of claim 12, further comprising a transmitting station that outputs the translation information that enables the referenced resource to be located.

18. The system of claim 12:

wherein said translation information includes lower level records indicative of a location of a referenced resource within a broadcast stream and higher level records indicative of a location of the lower level records; and wherein storage of less than all of said translation information is accomplished by storing less than all of the lower level records.

19. The system of claim 12, wherein said additional translation information points to a location, in said broadcast stream, of at least one further additional translation information for the referenced resource.

20. The system of claim 12, further comprising:

means for examining said additional translation information for the referenced resource in one of said at least one location;

means for second identifying a location of at least one further additional translation information for the referenced resource based on said examined additional translation information; and means for repeating said examining and said second identifying until the location of the referenced resource is found.

21. The system of claim 12, wherein said translation information includes lower level records indicative of a location of a referenced resource within a broadcast stream and higher level records indicative of a location of the lower level records.

22. The system of claim 12, wherein the resource is referenced by a URL.

23. A receiver usable in a broadcasting environment, comprising:
   a memory that stores less than all translation information received, said translation information being used to locate a referenced resource; and
   means for identifying at least one location, in a broadcast stream, of additional translation information for the referenced resource by referring to the translation information stored in the memory corresponding to the referenced resource.

24. The receiver of claim 23:
   wherein said translation information includes lower level records indicative of a location of a referenced resource within a broadcast stream and higher level records indicative of a location of the lower level records; and
   wherein storage of less than all of said translation information is accomplished by storing less than all of the lower level records.

25. The receiver of claim 23, wherein said additional translation information points to a location, in said broadcast stream, of at least one further additional translation information for the referenced resource.

26. The receiver of claim 23, further comprising:
   means for examining said additional translation information for the referenced resource in one of said at least one location;
   means for second identifying a location of at least one further additional translation information for the referenced resource based on said examined additional translation information; and
   means for repeating said examining and said second identifying until the location of the referenced resource is found.

27. The receiver of claim 23, wherein said translation information includes lower level records indicative of a location of a referenced resource within a broadcast stream and higher level records indicative of a location of the lower level records.

28. The receiver of claim 23, wherein the resource is referenced by a URL.

29. A method for enabling a referenced resource to be located within a broadcast stream, the broadcast stream including translation tables, each translation table including lower level records indicative of a location of a referenced resource within said broadcast stream and higher level records indicative of the location of lower level records in said broadcast stream, the method comprising:
   receiving said translation tables at a receiver;
   storing, for at least one of said translation tables, an abbreviated version of the translation table having all of the higher level records but less than all of the lower level records; and
   identifying a location of additional translation information for the referenced resource based on the higher level records of the truncated translation table stored in the receiver memory corresponding to said referenced resource.

30. A method for enabling a referenced resource to be located via translation tables within a broadcast stream, the method comprising:
   creating lower level records indicative of a location of a referenced resource within said broadcast stream and higher level records indicative of the location of lower level records in said broadcast stream; and
   creating translation tables that include both said lower level records and said higher level records; and
   arranging for said translation tables to be inserted into said broadcast stream.

31. The method of claim 30, wherein said translation tables are created such that records therein include a parameter to indicate the type thereof as being lower level or higher level.

32. A method for enabling a referenced resource to be located within a broadcasting environment, comprising:
   storing translation information into a receiver memory; and
   identifying a location of additional translation information for the referenced resource based on the translation information stored in the receiver memory corresponding to that referenced resource,
   wherein the step of storing the translation information in the receiver memory stores less than all of the translation information communicated to the receiver.

33. A system for enabling a referenced resource to be located within a broadcasting environment, comprising:
   a receiver memory that stores translation information; and
   means for identifying a location of additional translation information for the referenced resource based on the translation information stored in the receiver memory corresponding to that referenced resource,
   wherein the receiver memory stores less than all of the translation information communicated to the receiver.

34. A receiver comprising:
   a memory that stores less than all translation information received; and
   means for locating additional translation information based on the translation information stored,
   wherein said translation information includes lower level records indicative of a location of a referenced resource within a broadcast stream and higher level records indicative of a location of the lower level records in said broadcast stream, and
   wherein storage of less than all of said translation information is accomplished by storing less than all of the lower level records.

35. A method for enabling a referenced resource to be located within a broadcasting environment, comprising:
   storing translation information into a receiver memory;
   identifying at least one location, in a broadcast stream, of additional translation information for the referenced resource by referring to the translation information stored in the receiver memory corresponding to that referenced resource;
   examining said additional translation information for the referenced resource in one of said at least one location;
   second identifying a location of at least one further additional translation information for the referenced resource based on said examined additional translation information; and
   repeating said examining step and said second identifying step until the location of the referenced resource is found.

36. A method for enabling a referenced resource to be located within a broadcasting environment, comprising:
   storing translation information into a receiver memory; and identifying at least one location, in a broadcast stream, of additional translation information for the referenced resource by referring to the translation information stored in the receiver memory corresponding to that referenced resource, wherein said translation information includes lower level records indicative of a location of a referenced resource within a broadcast stream and higher level records indicative of a location of the lower level records in that broadcast stream.

37. A system for enabling a referenced resource to be located within a broadcasting environment, comprising:

a receiver memory that stores translation information;

means for identifying at least one location, in a broadcast stream, of additional translation information for the referenced resource by referring to the translation information stored in the receiver memory corresponding to that referenced resource;

means for examining said additional translation information for the referenced resource in one of said at least one location;

means for second identifying a location of at least one further additional translation information for the referenced resource based on said examined additional translation information; and means for repeating said examining and said second identifying until the location of the referenced resource is found.

38. A system for enabling a referenced resource to be located within a broadcasting environment, comprising:

a receiver memory that stores translation information; and means for identifying at least one location, in a broadcast stream, of additional translation information for the referenced resource by referring to the translation information stored in the receiver memory corresponding to that referenced resource;

wherein said translation information includes lower level records indicative of a location of a referenced resource within a broadcast stream and higher level records indicative of a location of the lower level records in that broadcast stream.

* * * * *